United States Patent
Nishio

(10) Patent No.: US 7,717,311 B2
(45) Date of Patent: May 18, 2010

(54) METHOD FOR DIVIDING SUBSTRATE AND METHOD FOR MANUFACTURING SUBSTRATE USING SUCH METHOD

(75) Inventor: Yoshitaka Nishio, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 853 days.

(21) Appl. No.: 10/535,770

(22) PCT Filed: Nov. 19, 2003

(86) PCT No.: PCT/JP03/14772
§ 371 (c)(1),
(2), (4) Date: Oct. 31, 2005

(87) PCT Pub. No.: WO2004/048058
PCT Pub. Date: Jun. 10, 2004

(65) Prior Publication Data
US 2006/0126200 A1    Jun. 15, 2006

(30) Foreign Application Priority Data
Nov. 22, 2002    (JP) ............................. 2002-340051

(51) Int. Cl.
B26F 3/00    (2006.01)
(52) U.S. Cl. ................... 225/2; 225/96; 83/879
(58) Field of Classification Search .......... 225/2, 225/94–96; 83/51, 885; 438/460–464
See application file for complete search history.

(56) References Cited
U.S. PATENT DOCUMENTS

| | | | | |
|---|---|---|---|---|
| 3,593,899 A | * | 7/1971 | DeTorre | ...................... 225/2 |
| 4,213,550 A | * | 7/1980 | Bonaddio | ...................... 225/2 |
| 4,225,070 A | * | 9/1980 | Dahlberg et al. | ............... 225/2 |
| 4,459,888 A | * | 7/1984 | Frye | ............................ 83/507 |
| 4,487,350 A | * | 12/1984 | DeTorre | ........................ 225/2 |
| 5,786,266 A | * | 7/1998 | Boruta | ....................... 438/462 |
| 6,774,978 B2 | | 8/2004 | Shin | |
| 6,796,212 B2 | * | 9/2004 | Maekawa et al. | ............. 83/886 |

FOREIGN PATENT DOCUMENTS

| | | |
|---|---|---|
| JP | 6-48755 | 2/1994 |
| JP | 9-188534 | 7/1997 |
| JP | 10-330125 | 12/1998 |
| KR | 2003-0067998 | 8/2003 |

OTHER PUBLICATIONS

International Search Report for corresponding Application No. PCT/JP2003/014772, mailed Mar. 9, 2004.
Korean Office Action for corresponding Application No. 519980662758 dated Sep. 26, 2006.

* cited by examiner

Primary Examiner—Boyer D. Ashley
Assistant Examiner—Edward Landrum
(74) Attorney, Agent, or Firm—Renner, Otto, Boisselle & Sklar, LLP

(57)    ABSTRACT

Vertical cracks Vm in the thickness direction of a mother glass substrate 10 are sequentially formed along lines to be scribed and broken, and thus main scribe lines MS are formed along the lines to be scribed and broken of the mother glass substrate 10. Then, subordinate scribe lines SS are formed along the main scribe lines MS which have been formed, at a predetermined distance from the main scribe lines MS. Thus, the mother glass substrate 10 is broken along the main scribe lines MS. In this manner, the substrate can be scribed and broken efficiently without requiring a complicated device or the like.

15 Claims, 11 Drawing Sheets

——————— Main scribe line
- - - - - - - Subordinate scribe line

METHOD FOR DIVIDING SUBSTRATE AND METHOD FOR MANUFACTURING SUBSTRATE USING SUCH METHOD

TECHNICAL FIELD

The present invention relates to a substrate scribing and breaking method carried out for scribing and breaking a brittle material substrate such as a glass substrate or the like used for a display panel substrate of a flat panel display (FPD) into a plurality of substrates.

BACKGROUND ART

Display panel substrates of liquid crystal display apparatuses or the like are usually produced using glass substrates, which are brittle material substrates. A liquid crystal display apparatus is produced by assembling a pair of glass substrates with an appropriate gap interposed therebetween and then enclosing a liquid crystal material in the gap.

For producing such a display panel substrate, an assembled mother substrate produced by assembling a pair of mother glass substrates is scribed and broken. Thus, a plurality of display panel substrates are produced from the assembled mother substrate. A substrate scribing and breaking method used for scribing and breaking an assembled mother substrate is disclosed in Japanese Laid-Open Publication No. H6-48755 (patent document 1).

FIGS. 15A through 15D show steps of scribing and breaking a mother substrate described above. In the following description, for the sake of simplicity, among a pair of mother glass substrates facing each other which are assembled together to produce an assembled mother glass substrate, one mother glass substrate will be referred to as the "A side glass substrate" and the other will be referred to as the "B side glass substrate".

(1) First, as shown in FIG. 15A, an assembled mother substrate 901 is placed on a first scribing device with an A side glass substrate of the assembled mother substrate 901 as an upper substrate. Using a cutter wheel 902, a scribe line Sa is formed in the A side glass substrate.

(2) Next, the assembled mother substrate 901 with the scribe line Sa formed in the A side glass substrate is inverted, and the assembled mother substrate 901 is transported to a first breaking device. In the first breaking device, as shown in FIG. 15B, the assembled mother substrate 901 is placed on a mat 904. A break bar 903 is pressed on the B side glass substrate of the assembled mother substrate 901 along the scribe line Sa formed in the A side glass substrate. By this operation, a vertical crack extends upward from the scribe line Sa in the A side glass substrate which is placed as a lower substrate, and the A side glass substrate is broken along the scribe line Sa.

(3) Next, the assembled mother substrate 901 with the A side glass substrate being broken is transported to a second scribing device without inverting the assembled mother substrate 901. In the second scribing device, as shown in FIG. 15C, a surface of the B side glass substrate of the assembled mother substrate 901 is scribed using the cutter wheel 902, and thus a scribe line Sb is formed parallel to the scribe line Sa. The scribe line Sb formed in the B side glass substrate is often formed offset in the horizontal direction from the scribe line Sa formed in the A side glass substrate. The reason is that the assembled mother substrate 901 has a plurality of display panel areas and an electrode terminal portion needs to be formed on a peripheral portion of one of the glass substrates of the display panel substrate.

(4) Then, the assembled mother substrate 901 is inverted to put the A side glass substrate as the upper substrate, and is transported to a second breaking device. In the second breaking device, as shown in FIG. 15D, the assembled mother substrate 901 is placed on the mat 904. A break bar 903 is pressed on the A side glass substrate, at a portion corresponding to the scribe line Sb formed in the B side glass substrate, along the scribe line Sb. By this operation, the B side glass substrate as the lower substrate is broken along the scribe line Sb.

By performing the above steps (1) through (4), the assembled mother substrate 901 is scribed and broken at a desired position.

The above-described substrate scribing and breaking method requires an inversion step for inverting the assembled mother substrate in order to scribe and break one of the mother glass substrates of the assembled mother substrate, and a breaking step of breaking the one mother glass substrate by extending a vertical crack formed by scribing the one mother glass substrate. There is a problem that a substrate scribing and breaking device for performing these steps requires a complicated structure and a large area for installment.

The above-described substrate scribing and breaking method also has a problem that a demand for reducing the production cost of display panels cannot be fully met.

A method used in a conventional breaking step, i.e., a method of pressing a rear surface of a substrate along a scribe line to scribe and break the substrate, has a problem that an edge of a broken surface of the substrate is, for example, easily chiseled off.

The present invention, for solving these problems, has an objective of providing a method for scribing and breaking a substrate efficiently without requiring a complicated device.

DISCLOSURE OF THE INVENTION

According to the present invention, a substrate scribing and breaking method is provided, which includes the steps of forming a main scribe line along a line to be scribed and broken of a brittle substrate; and forming a subordinate scribe line immediately close to, and substantially parallel to, the main scribe line which has been formed; wherein the substrate is broken along the main scribe line by the formation of the subordinate scribe line.

Namely, a vertical crack having a surface of the substrate as a base portion is formed along the line to be scribed and broken by the formation of the main scribe line; a compressive force is generated on a surface portion of the vertical crack by the formation of the subordinate scribe line, thereby generating a tensile force on a bottom portion of the substrate; and the vertical crack can extend to the bottom portion of the substrate to break the substrate.

According to a conventional method, a vertical crack having a surface of the substrate as a base portion is formed along the line to be scribed and broken by the formation of the scribe line; a substrate inversion device is used to invert the substrate; then, a breaking device is used to break the substrate from a rear surface of the substrate to generate a compressive force on the substrate surface portion of the vertical crack, thereby generating a tensile force on a bottom portion of the substrate; and the vertical crack extends to the bottom portion of the substrate to break the substrate. According to the substrate subscribing and breaking method of the present invention, the substrate can be broken by forming a subordinate scribe line on the surface of the substrate on which a main scribe line has been formed, without inverting the substrate and breaking the substrate from the rear surface thereof as conventionally required.

As a result, the substrate inversion device and the breaking device are not necessary, and therefore the structure can be simplified and the installment area can be reduced.

The substrate scribing and breaking method is characterized in that the subordinate scribe line is formed at a distance of 0.5 mm to 1 mm from the main scribe line.

The substrate scribing and breaking method is characterized in that the main scribe line is formed of a vertical crack extending over at least 80% of the thickness direction of the substrate from the surface of the substrate.

More preferably, the substrate scribing and breaking method is characterized in that the main scribe line is formed of a vertical crack extending over at least 90% of the thickness direction of the substrate from the surface of the substrate.

The main scribe line is formed by a disc-shaped cutter wheel which rolls on the surface of the substrate; a central portion of an outer circumferential surface of the cutter wheel in a thickness direction thereof projects outward to form a V-shape of an obtuse angle; and a plurality of protrusions having a predetermined height are provided at the obtuse angled portion along the entire circumference at a predetermined pitch. Thus, a vertical crack extending over at least 80% of the thickness direction of the substrate from the surface of the substrate can be easily formed.

A forming direction of the main scribe line and a forming direction of the subordinate scribe line by the cutter wheel are opposite to each other; and the cutter wheel forms the main scribe line and the subordinate scribe line continuously in the state of being in contact with the surface of the substrate. Thus, the distance by which the cutter wheel moves from a formation end position of the main scribe line to a formation start position of the subordinate scribe line can be shortened. In addition, the cutter wheel can be easily positioned to the formation start position of the subordinate scribe line.

Either the main scribe line or the subordinate scribe line is formed such that a start position or an end position thereof is an appropriate distance away from at least one end of the line to be scribed and broken. Thus, an end portion of the substrate can be prevented from being chiseled off.

Preferably, the substrate scribing and breaking method is characterized in that after at least two main scribe lines are formed by a cutter wheel tip along at least two continuous lines to be scribed and broken of the substrate, subordinate scribe lines which are substantially parallel to the at least two main scribe lines which have been formed are formed by the cutter wheel tip.

Preferably, the substrate scribing and breaking method is characterized in that the main scribe lines are formed continuously without separating the cutter wheel tip from the surface of the substrate.

Preferably, the substrate scribing and breaking method is characterized in that the subordinate scribe lines are formed continuously without separating the cutter wheel tip from the surface of the substrate.

Preferably, the substrate scribing and breaking method is characterized in that the cutter wheel tip forms one of the scribe lines, then moves on the substrate so as to draw a circular line, and then forms the other of the scribe lines.

Preferably, the substrate scribing and breaking method is characterized in that while the cutter wheel tip moves on the substrate so as to draw a circular line, a pressure acting on the substrate is lower than a pressure acting on the substrate when each of the scribe lines is formed.

According to another aspect of the present invention, a panel production method for scribing and breaking a brittle substrate to produce a plurality of quadrangular panels which are continuous in at least one direction is provided. The method includes the steps of setting four lines to be scribed and broken for the four-sided panels on the substrate; forming scribe lines along two lines to be scribed and broken facing each other which have been set; and then forming scribe lines along the remaining two lines to be scribed and broken facing each other which have been set; wherein the scribe lines along the remaining two lines to be scribed and broken are formed so as to cross the scribe lines along the two lines to be scribed and broken first formed, thereby breaking the substrate along the scribe lines to produce the quadrangular panels.

Namely, when the scribe lines later formed cross the two scribe lines first formed, a force for pushing wide the vertical crack forming the scribe lines first formed is generated. By this force, the substrate is broken along the scribe lines.

Accordingly, the substrate can be broken by forming the subordinate scribe lines on the surface of the substrate on which the main scribe lines have been formed, without inverting the substrate and breaking the substrate from the rear surface thereof as conventionally required.

As a result, the substrate inversion device and the breaking device are not necessary, and therefore the structure can be simplified and the installment area can be reduced.

According to another aspect of the present invention, a panel production method for scribing and breaking a brittle substrate to produce a plurality of quadrangular panels continuous in at least one direction is provided. The method includes the steps of setting four lines to be scribed and broken for the four-sided panels on the substrate; forming main scribe lines along the four lines to be scribed and broken which have been set; and forming subordinate scribe lines immediately close to, and substantially parallel to, the main scribe lines which have been formed; wherein the substrate is broken along the main scribe lines by the formation of the subordinate scribe lines to produce the quadrangular panels.

The scribe lines are formed along the four lines to be scribed and broken which have been formed for the panels. Thus, the substrate can be broken by forming the subordinate scribe lines on the surface of the substrate on which the main scribe lines have been formed, without inverting the substrate and breaking the substrate from the rear surface thereof as conventionally required.

As a result, the substrate inversion device and the breaking device are not necessary, and therefore the structure can be simplified and the installment area can be reduced.

A scribe line is formed along at least one of the remaining two lines to be scribed and broken facing each other, using a substrate scribing and breaking method according to the present invention. Thus, the substrate can be broken by forming the subordinate scribe lines on the surface of the substrate on which the main scribe lines have been formed, without inverting the substrate and breaking the substrate from the rear surface thereof as conventionally required.

As a result, the substrate inversion device and the breaking device are not necessary, and therefore the structure can be simplified and the installment area can be reduced.

BEST MODE FOR CARRYING OUT THE INVENTION

Hereinafter, the present invention will be described by way of examples with reference to the drawings.

Figure 1:
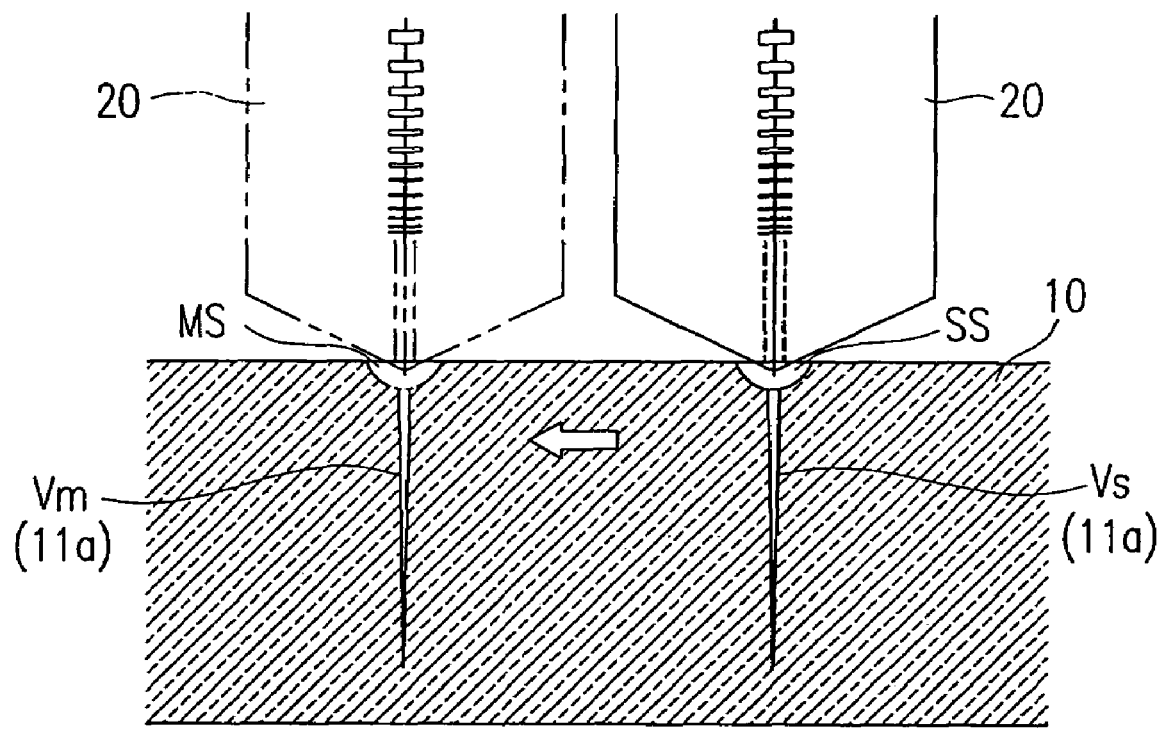
FIG. 1 is a cross-sectional view of a substrate illustrating the principle of a substrate scribing and breaking method according to the present invention.

First, the principle of a substrate scribing and breaking method according to the present invention will be described. The substrate scribing and breaking method according to the present invention is carried out for, for example, scribing and breaking a single mother glass substrate to obtain a plurality of glass substrates. According to the substrate scribing and breaking method of the present invention, as shown in FIG. 1, a cutter wheel 20, for example, is pressure-contacted and rolled on a mother glass substrate 10 along a line to be scribed and broken of the mother glass substrate 10 (along which the mother glass substrate 10 will be scribed and broken). Thus, the mother glass substrate 10 is scribed. By this operation, a vertical crack Vm in the thickness direction of the mother glass substrate 10 is sequentially formed along the line to be scribed and broken. Thus, a main scribe line MS is formed. The vertical crack Vm is formed so as to extend over 80% or more, more preferably 90% or more, of the thickness of the mother glass substrate 10 from a surface of the mother glass substrate 10.

Then, outside an area of a glass substrate obtained by scribing and breaking the mother glass substrate 10, the cutter wheel 20 is pressure-contacted and rolled on the mother glass substrate 10 substantially parallel to the main scribe line MS at a distance of about 0.5 mm to 1 mm from the main scribe line MS. Thus, the mother glass substrate 10 is scribed. By this operation, a vertical crack Vs in the thickness direction of the mother glass substrate 10 is sequentially formed on the main scribe line MS. Thus, a subordinate scribe line SS is formed.

When the subordinate scribe line SS is formed, the cutter wheel 20 is pressure-contacted and rolled on the surface of the mother glass substrate 10 and thus a blade of the cutter wheel 20 eats into the surface of the mother glass substrate 10. Therefore, a surface portion of the mother glass substrate 10 is subjected to a compressive force, which acts on a surface portion of the vertical crack Vm forming the main scribe line MS already formed. The vertical crack Vm forming the main scribe line MS extends over 80% or more of the thickness of the mother glass substrate 10. Since the surface portion of the mother glass substrate 10 is compressed, the opening of the vertical crack Vm (forming the main scribe line MS) in the surface portion of the mother glass substrate 10 is compressed and the vertical crack Vm is pulled toward a bottom surface of the mother glass substrate 10. Therefore, the vertical crack Vm extends toward, and reaches, the bottom surface of the mother glass substrate 10. The vertical crack Vm reaches the bottom surface of the mother glass substrate 10 over the entire length of the main scribe line MS. As a result, the mother glass substrate 10 is broken along the main scribe line MS.

The subordinate scribe line SS is preferably formed at a distance of about 0.5 mm to 1 mm from the main scribe line MS. When the subordinate scribe line SS is formed at a distance of less than 0.5 mm from the main scribe line MS, an excessively large compressive force acts on the surface portion of the vertical crack Vm forming the main scribe line MS, which may undesirably result in a damage such as a chiseled-off or the like at an end of the vertical crack Vm on the surface of the mother glass substrate 10. When the subordinate scribe line SS is formed at a distance of more than 1.0 mm from the main scribe line MS, the compressive force acting on the surface portion of the vertical crack Vm forming the main scribe line MS is insufficient, which may undesirably result in the vertical crack Vm not reaching the bottom surface of the mother glass substrate 10.

Figure 2A:
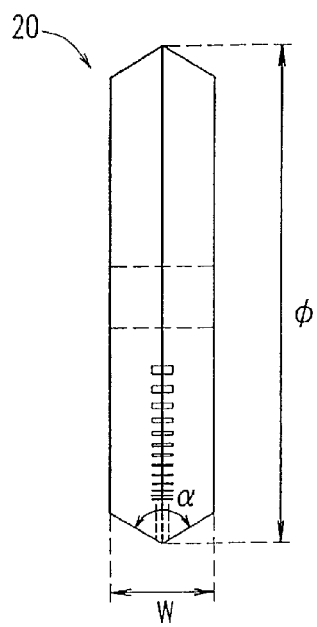
FIG. 2A is a front view of a cutter wheel used for carrying out the substrate scribing and breaking method according to the present invention.
Figure 2C:
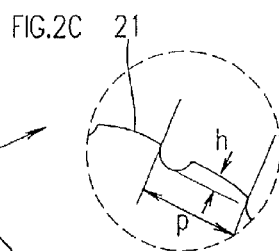
FIG. 2C is a partial enlarged view of FIG. 2B.
Figure 2B:
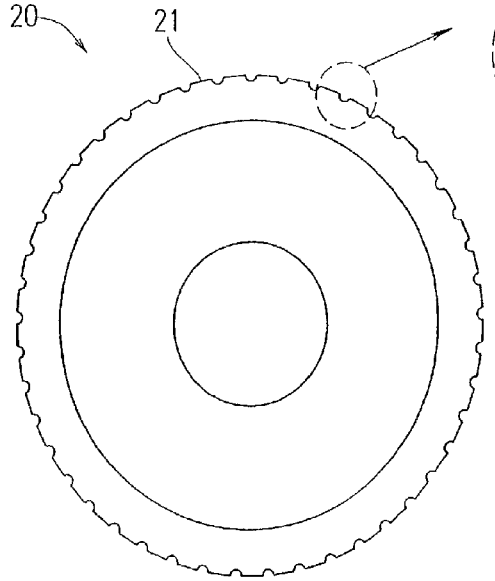
FIG. 2B is a side view thereof.

FIG. 2A is a front view of the cutter wheel 20 disclosed in Japanese Laid-Open Publication No. H9-188534 as used for such a substrate scribing and breaking method. FIG. 2B is a side view thereof, and FIG. 2C is a partial enlarged view thereof. The cutter wheel 20 is disc-shaped and has a diameter of $\phi$ and a thickness of W. An outer circumferential surface is V-shaped with the center of the thickness W direction projecting outward. A tip of the projection forms a blade portion having an obtuse angle $\alpha$. The blade portion has a plurality of protrusions 21 formed along the entire circumference at a predetermined pitch p. The protrusions 21 have a predetermined height h. Each of the protrusions 21 has a micron-order size and cannot be actually viewed by naked eye.

The cutter wheel 20 having such a structure has a very high capability of forming a vertical crack. As described above, a deep vertical crack 11a extending over about 90% of the thickness of the mother glass substrate 10 from the surface thereof can be formed by scribing the mother glass substrate 10 using the cutter wheel 20. Accordingly, the mother glass substrate 10 can be broken with certainty by carrying out the substrate scribing and breaking method according to the present invention using the cutter wheel 20.

The substrate scribing and breaking method according to the present invention is not limited to using the cutter wheel 20. Any means is usable as long as a vertical crack forming the main scribe line extends over about 80% or more of the thickness of the substrate from the surface of the substrate. For example, a scribing device for vibrating a scribe cutter using a vibrator (piezoelectric device) to form a vertical crack in a substrate is usable.

The formation direction of the main scribe line MS and the formation direction of the subordinate scribe line SS may be opposite to each other. In this case, while the cutter wheel 20 is in contact with the surface of the mother glass substrate 10 from a formation end position of the main scribe line MS to a formation start position of the subordinate scribe line SS, the scribe direction is inverted. In this embodiment, the moving distance of the cutter wheel 20 from the formation end position of the main scribe line MS to the formation start position of the subordinate scribe line SS can be shortened, and in addition, the cutter wheel 20 can be easily placed at the formation start position of the subordinate scribe line SS. Therefore, the mother glass substrate 10 can be efficiently broken.

Next, a practical example of a method for scribing and breaking glass substrates from a mother glass substrate using the substrate scribing and breaking method according to the present invention will be described. In the following description, a mother glass substrate is broken without being assembled with another mother glass substrate. The present invention is not limited to this, and is applicable to the case where each of a pair of mother glass substrates assembled together is broken.

Figure 3:
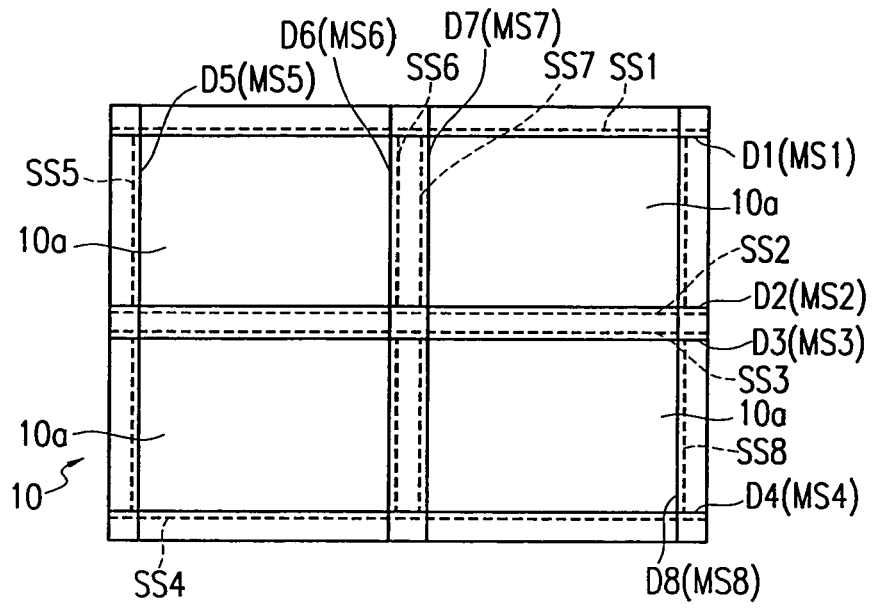
FIG. 3 is a plan view of a mother glass substrate illustrating a substrate scribing and breaking method according to the present invention.

FIG. 3 is a plan view illustrating a scribe pattern for scribing and breaking glass substrates 10a from the mother glass substrate 10 using double scribe lines, i.e., the main scribe line MS and the subordinate scribe line SS. In this example, the mother glass substrate 10 is scribed and broken along first through eighth lines to be scribed and broken D1 through D8 in this order. As a result, four glass substrates 10a (two rows× two columns) are obtained.

The first line to be scribed and broken D1 corresponds to a row-direction (lateral-direction) edge of the two glass substrates 10a in the first row. The first line to be scribed and broken D1 is at a predetermined distance from one row-direction edge of the mother glass substrate 10. The second line to be scribed and broken D2 corresponds to a row-direction edge of the two glass substrates 10a in the first row, the row-direction edge being close to the glass substrates 10a in the second row. The third line to be scribed and broken D3 corresponds to a row-direction edge of the two glass substrates 10a in the second row, the row-direction edge being close to the glass substrates 10a in the first row. The third line to be scribed and broken D3 is at a distance of 2 mm to 4 mm from the second line to be scribed and broken D2. The fourth line to be scribed and broken D4 corresponds to a row-direction (lateral-direction) edge of the two glass substrates 10a in the second row. The fourth line to be scribed and broken D4 is at a predetermined distance from the other row-direction edge of the mother glass substrate 10.

The fifth line to be scribed and broken DS corresponds to a column-direction (perpendicular-direction) edge of the two glass substrates 10a in the first column. The fifth line to be scribed and broken D5 is at a predetermined distance from one column-direction edge of the mother glass substrate 10. The sixth line to be scribed and broken D6 corresponds to a column-direction edge of the two glass substrates 10a in the first column, the column-direction edge being close to the glass substrates 10a in the second column. The seventh line to be scribed and broken D7 corresponds to a column-direction edge of the two glass substrates 10a in the second column, the column-direction edge being close to the glass substrates 10a in the first column. The seventh line to be scribed and broken D7 is at a distance of 2 mm to 4 mm from the sixth line to be scribed and broken D6. The eighth line to be scribed and broken D8 corresponds to a column-direction (perpendicular-direction) edge of the two glass substrates 10a in the second column. The eighth line to be scribed and broken D8 is at a predetermined distance from the other column-direction edge of the mother glass substrate 10.

The mother glass substrate 10 is scribed and broken as follows. The cutter wheel 20, for example, is first rolled while in pressure contact with the mother glass substrate 10 along the first through fourth lines to be scribed and broken D1 through D4 in this order. By this operation, a vertical crack having a depth of 90% or more of the thickness of the mother glass substrate 10 is formed immediately below first through fourth main scribe lines MS1 through MS4.

In this example, the phenomenon that the vertical crack generated by the formation of a scribe line advances in a direction parallel to the surface of the mother glass substrate 10 will be referred to as "proceed". The phenomenon that the vertical crack generated by the formation of a scribe line advances in a direction perpendicular to the surface of the mother glass substrate 10 will be referred to as "extension".

Once the above-described state is obtained, the cutter wheel 20 is rolled in pressure contact with the mother glass substrate 10 along the fifth line to be scribed and broken D5. By this operation, a fifth main scribe line MS5 is formed along the fifth line to be scribed and broken D5.

After this the cutter wheel 20 is rolled in pressure contact with the mother glass substrate 10 along the sixth through eighth lines to be scribed and broken D6 through D8 in this order. Thus, sixth through eighth main scribe lines MS6 through MS8 are formed along the sixth through eighth lines to be scribed and broken D6 through D8 in this order.

After the first through eighth main scribe lines MS1 through MS8 are formed in this manner, the cutter wheel 20 is rolled in pressure contact with the mother glass substrate 10 along a line parallel to the edge of the mother glass substrate 10. The line is on the opposite side to the glass substrates 10a in the first row with respect to the first main scribe line MS1 and is at a distance of about 0.5 mm to 1 mm from the first main scribe line MS1. Thus, a first subordinate scribe line SS1 is formed along the first main scribe line MS1. By this operation, a vertical crack forming the first main scribe line MS1 extends toward, and reaches, the bottom surface of the mother glass substrate 10. By this action occurring along the entirety of the first main scribe line MS1, the mother glass substrate 10 is broken along the first main scribe line MS1.

Next, a second subordinate scribe line SS2 is formed using the cutter wheel 20. The second subordinate scribe line SS2 is parallel to the second main scribe line MS2, is on the opposite side to the glass substrates 10a in the first row with respect to the second main scribe line MS2, and is at a distance of about 0.5 mm to 1 mm from the second main scribe line MS2. By this operation, a vertical crack forming the second main scribe line MS2 extends toward, and reaches, the bottom surface of the mother glass substrate 10. By this action occurring along the entirety of the second main scribe line MS2, the mother glass substrate 10 is broken along the second main scribe line MS2.

A third subordinate scribe line SS3 and a fourth subordinate scribe line SS4 are formed respectively along the third main scribe line MS3 and the fourth main scribe line MS4, on the opposite side to the glass substrates 10a in the second row with respect to the third main scribe line MS3 and the fourth main scribe line MS4. Then, the mother glass substrate 10 is broken along the third main scribe line MS3 and the fourth main scribe line MS4.

Then, fifth through eighth subordinate scribe lines SS5 through SS8 are formed along the fifth through eighth main scribe lines MS5 through MS8 between the first main scribe line MS1 and the second main scribe line MS2 and between the third main scribe line MS3 and the fourth main scribe line MS4, respectively. The fifth through eighth subordinate scribe lines SS5 through SS8 are respectively formed on the opposite sides to the glass substrates 10a in the first column and in the second column with respect to the fifth through eighth main scribe lines MS5 through MS8. By this operation, the mother glass substrate 10 is broken along the fifth through eighth main scribe lines MS5 through MS8. Unnecessary portions are removed, and the four glass substrates 10a are obtained.

In this case, the first through eighth main scribe lines MS1 through MS8 are formed along the entirety of the lines to be scribed and broken D1 through D8 which are formed between opposing end surfaces of the mother glass substrate 10. The first through eighth subordinate scribe lines SS1 through SS8 are formed between opposing end surfaces or opposing broken surfaces of the mother glass substrate 10.

The present invention is not limited to forming the first through eighth main scribe lines MS1 through MS8 along the entirety of the lines to be scribed and broken D1 through D8 which are formed between opposing end surfaces of the mother glass substrate 10 and forming the first through eighth subordinate scribe lines SS1 through SS8 between opposing end surfaces or opposing broken surfaces of the mother glass substrate 10.

Figure 4:
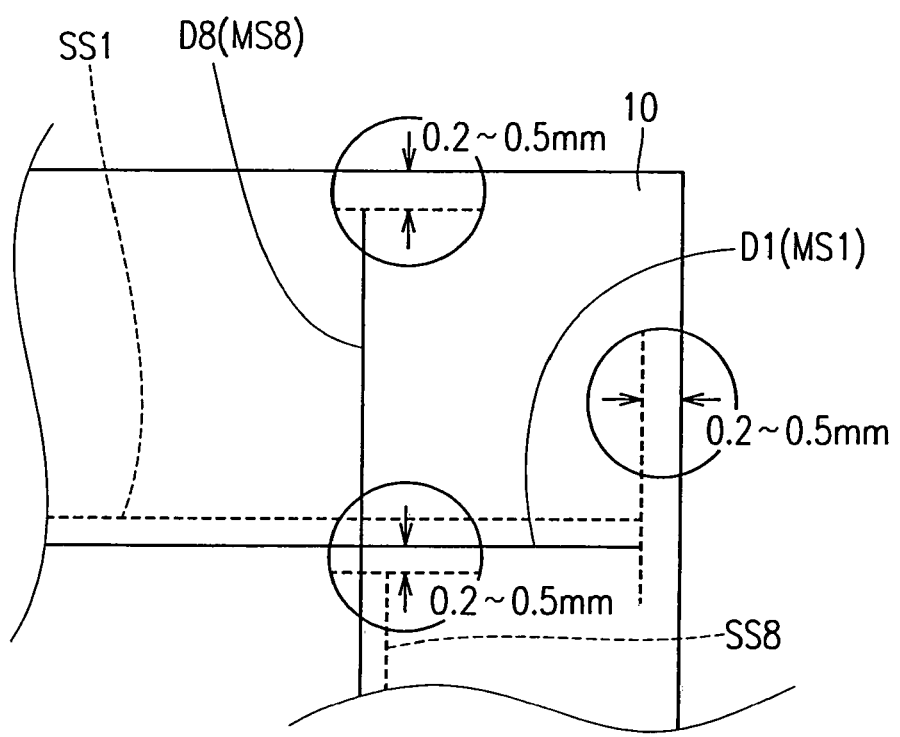
FIG. 4 is a partial plan view of a mother glass substrate illustrating another substrate scribing and breaking method according to the present invention.

The following method shown in FIG. 4 is also usable. A position at an appropriate distance of about 0.2 mm to 0.5 mm from one end surface of the mother glass substrate 10 is set as a start point of each of first through eighth main scribe lines MS1 through MS8. Similarly, a position at an appropriate distance of about 0.2 mm to 0.5 mm from the other end surface of the mother glass substrate 10 is set as an end point of each of the first through eighth main scribe lines MS1 through MS8.

In this case, when the cutter wheel 20 is rolled in pressure contact with the mother glass substrate 10 to scribe the mother glass substrate 10, a vertical crack proceeds in forward and backward directions from the scribe start position. Therefore, the first through eighth main scribe lines MS1 through MS8 each reach one end surface of the mother glass substrate 10.

Similarly, even through the scribe end position of each of the first through eighth main scribe lines MS1 through MS8 is at a distance from the other end surface of the mother glass substrate 10, the vertical crack proceeds in the scribe direction. Therefore, the first through eighth main scribe lines MS1 through MS8 each reach the other end surface of the mother glass substrate 10.

Based on this, it is not necessary to form each of first through eighth subordinate scribe line SS1 through SS8 from one end surface to the other end surface, or from one broken surface to the other broken surface, of the mother glass substrate 10. According to the method shown in FIG. 4, a position at an appropriate distance of about 0.2 mm to 0.5 mm from one end surface or one broken surface of the mother glass substrate 10 is set as a start point of each of the first through eighth subordinate scribe lines SS1 through SS8. Similarly, a position at an appropriate distance of about 0.2 mm to 0.5 mm from the other end surface or the other broken surface of the mother glass substrate 10 is set as an end point of each of the first through eighth subordinate scribe lines SS1 through SS8.

Alternatively, the following method is usable. One of (i) first through eighth main scribe lines MS1 through HS8 and (ii) first through eighth subordinate scribe lines SS1 through SS8 are each formed from one end surface or one broken surface of the mother glass substrate 10 to the other end surface or the other broken surface of the mother glass substrate 10. The other of (i) the first through eighth main scribe lines MS1 through MS8 and (ii) the first through eighth subordinate scribe lines SS1 through SS8 are each formed from a position which is at an appropriate distance from one end surface or one broken surface of the mother glass substrate 10 to a position which is at an appropriate distance from the other end surface or the other broken surface of the mother glass substrate 10.

Figure 5A:
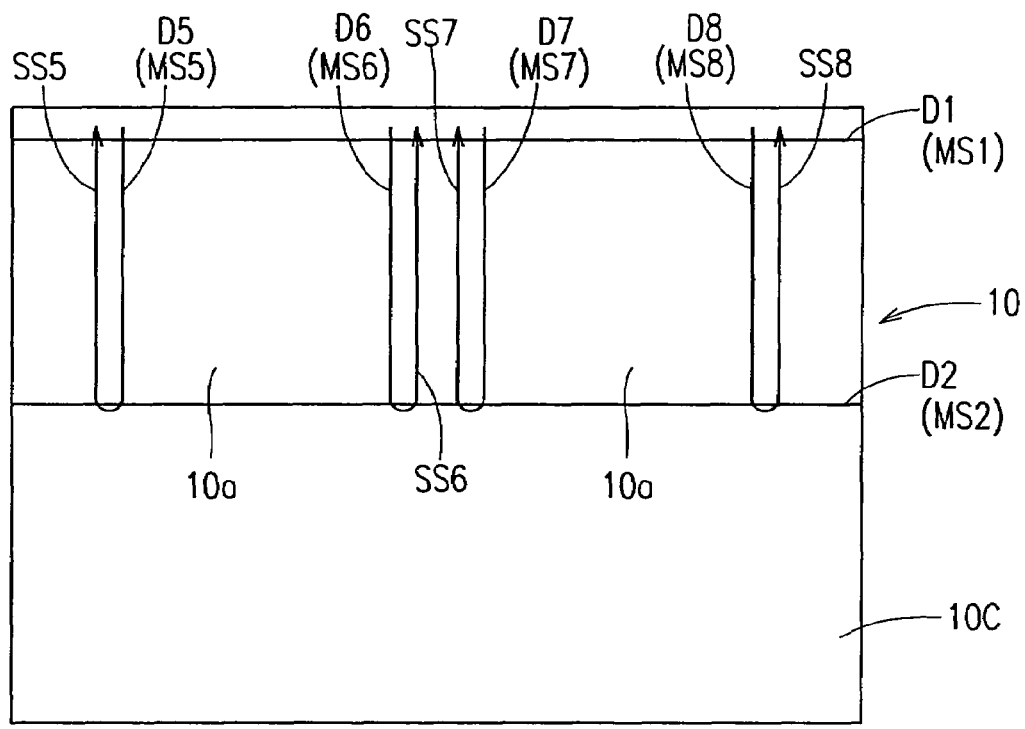
FIGS. 5A and 5B are plan views of a mother glass substrate illustrating still another substrate scribing and breaking method according to the present invention.
Figure 5B:
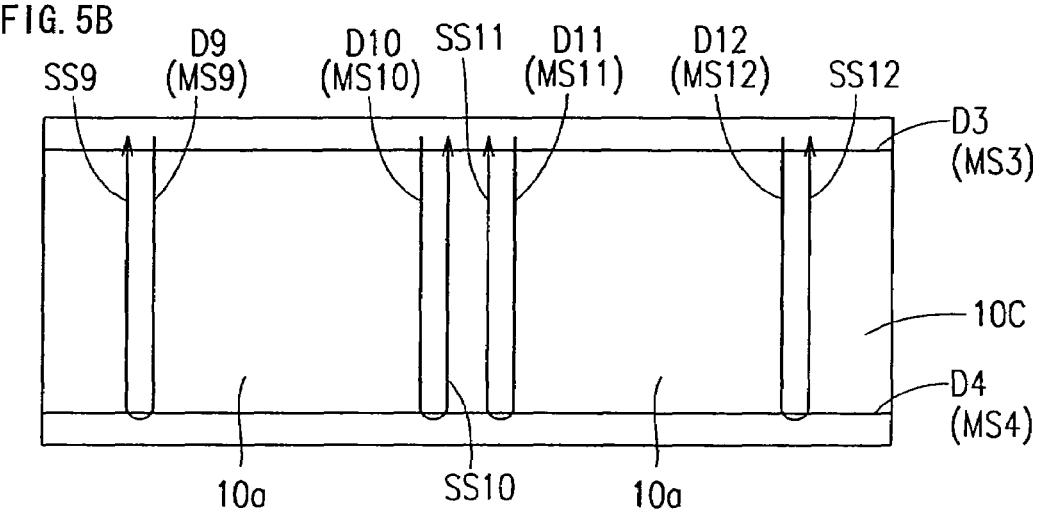

FIGS. 5A and 5B are plan views illustrating another scribe pattern for scribing and breaking glass substrates 10a from the mother glass substrate 10. According to this scribing method, first and second main scribe lines MS1 and MS2 are formed along first and second lines to be scribed and broken D1 and D2 in a lateral direction of the mother glass substrate 10, using the cutter wheel 20. A vertical crack forming each of the first and second main scribe lines MS1 and MS2 extends over 90% or more of the thickness of the mother glass substrate 10 from the surface thereof. Then, a fifth main scribe line MS5 is formed in an area between the first main scribe line MS1 and the second main scribe line MS2, along a fifth line to be scribed and broken D5 in a perpendicular direction (perpendicular to the lateral direction), using the cutter wheel 20. After this, a fifth subordinate scribe line SS5 is formed at a distance of about 0.5 mm to 1 mm from the fifth main scribe line MS5, on the opposite side from the glass substrate 10a with respect to the fifth main scribe line MS5.

In this case, the fifth main scribe line MS5 and the fifth subordinate scribe line SS5 cross the first and second main scribe lines MS1 and MS2 already formed. After the fifth main scribe line MS5 crosses the second main scribe line MS2, the cutter wheel 20 is rotated at 180 degrees to form the fifth subordinate scribe line SS5. In this manner, the fifth main scribe line MS5 and the fifth subordinate scribe line SS5 can be continuously formed in one scribe operation.

After this, similarly, a sixth main scribe line MS6 is formed in an area between the first main scribe line MS1 and the second main scribe line MS2, along a sixth line to be scribed and broken D6, using the cutter wheel 20. The cutter wheel 20 is rotated at 180 degrees to form the sixth subordinate scribe line SS6 on the opposite side from the glass substrate 10a with respect to the sixth main scribe line MS6. Then, a seventh main scribe line MS7 and a seventh subordinate scribe line SS7, and an eighth main scribe line MS8 and an eighth subordinate scribe line SS8 are sequentially formed in a similar manner. Since the fifth through eighth main scribe lines MS5 through MS8 and the fifth through eighth subordinate scribe lines SS5 through SS8 pass the first and second main scribe lines MS1 and MS2, a vertical crack forming each of the first and second main scribe lines MS1 and MS2 reaches the bottom surface of the mother glass substrate 10 with certainty over the entirety of the first and second main scribe lines MS1 and MS2. Therefore, the mother glass substrate 10 is broken along the first and second main scribe lines MS1 and MS2 with certainty, and thus a pair of glass substrates 10a are obtained.

An area of the mother glass substrate 10 which has not been scribed and broken is referred to as a second substrate area 10c.

Next, as shown in FIG. 5B, the cutter wheel 20 is rolled in pressure contact with the mother glass substrate 10 in the second substrate area 10c obtained by the second main scribe line MS2. Thus, third and fourth main scribe lines MS3 and MS4 are formed along third and fourth lines to be scribed and broken D3 and D4 in the lateral direction of the mother glass substrate 10. A vertical crack forming each of the third and fourth main scribe lines MS3 and MS4 extends over 90% or more of the thickness of the mother glass substrate 10 from the surface thereof. Then, in an area between the third main scribe line MS3 and the fourth main scribe line MS4, the following scribe lines are formed sequentially in the perpendicular direction so as to cross the third and fourth scribe lines MS3 and MS4: a ninth main scribe line MS5 along a ninth line to be scribed and broken D9 and a ninth subordinate scribe line SS9, a tenth main scribe line MS10 along a tenth line to be scribed and broken D10 and a tenth subordinate scribe line SS10, an eleventh main scribe line MS11 along an eleventh line to be scribed and broken D11 and an eleventh subordinate scribe line SS11, and a twelfth main scribe line MS12 along a twelfth line to be scribed and broken D12 and a twelfth subordinate scribe line SS12. The ninth subordinate scribe line SS9, the tenth subordinate scribe line SS10, the eleventh subordinate scribe line SS11, and the twelfth subordinate scribe line SS12 are formed outside the corresponding glass substrates 10a. In this manner, the second substrate area 10c is broken, and thus a pair of glass substrates 10a are obtained.

Figure 6:
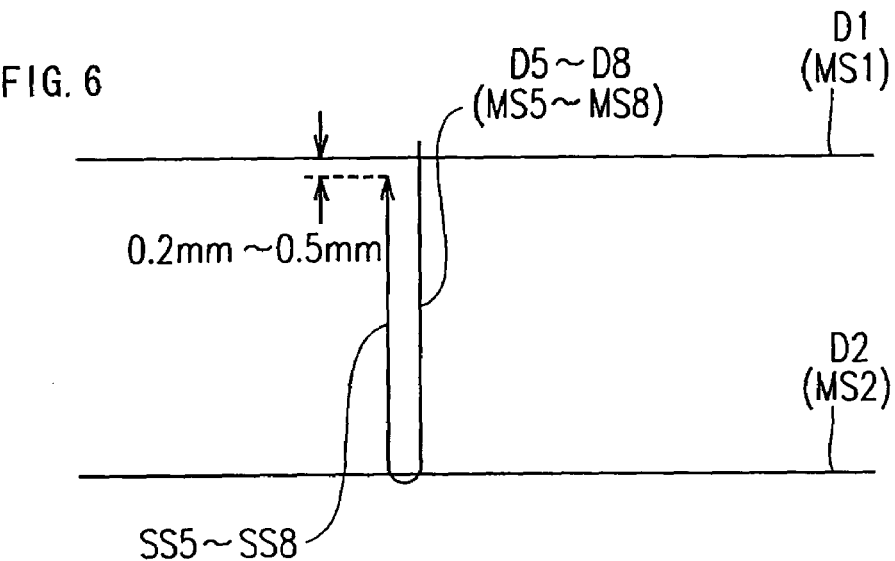
FIG. 6 is a partial plan view of a mother glass substrate illustrating still another substrate scribing and breaking method according to the present invention.

The fifth through twelfth subordinate scribe lines SS5 through SS12 do not need to cross the first and the third main scribe lines MS1 and MS3, respectively. For example, as shown in FIG. 6, a position which is about 0.2 mm to 0.5 mm before each of the first main scribe line MS1 and the third main scribe line MS3 may be set as an end position of each of the fifth through twelfth subordinate scribe lines SS5 through SS12. In this case also, a vertical crack forming each of the fifth through twelfth subordinate scribe lines SS5 through SS12 proceeds in the scribe direction. The mother glass substrate 10 is broken along the entirety of the fifth through twelfth main scribe lines MS5 through MS12.

Figure 7:
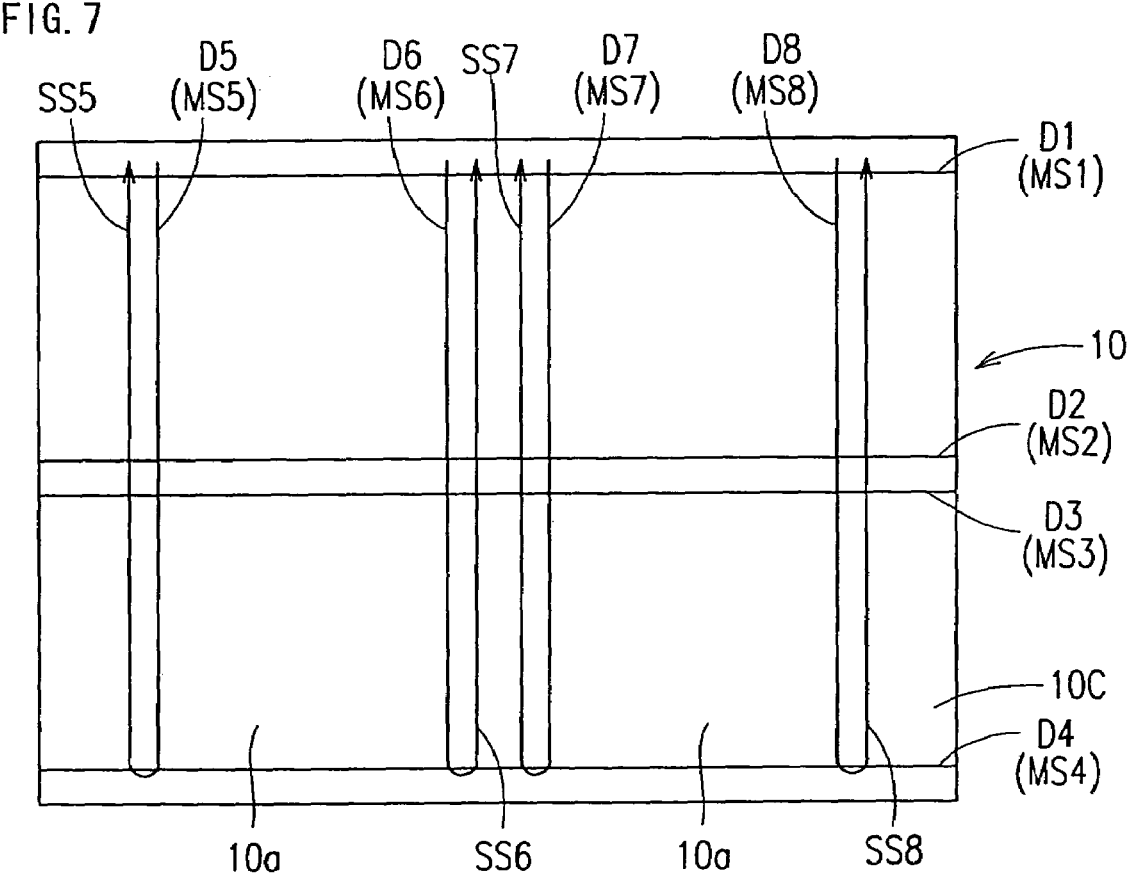
FIG. 7 is a plan view of a mother glass substrate illustrating still another substrate scribing and breaking method according to the present invention.

For breaking themother glass substrate 10 bycrossing scribe lines each other, the method shown in FIG. 7 is also usable. First through fourth main scribe lines MS1 through MS4 are formed in the mother glass substrate 10 along first through fourth lines to be scribed and broken D1 through D4. Thereafter, a fifth main scribe line MS5 and a fifth subordinate scribe line SS5, a sixth main scribe line MS6 and a sixth subordinate scribe line SS6, a seventh main scribe line MS7 and a seventh subordinate scribe line SS7, and an eighth main scribe line MS8 and an eighth subordinate scribe line SS8 are formed. The cutter wheel 20 is rotated at 180 degrees after each main scribe line crosses the fourth main scribe line MS4 to form the respective subordinate scribe line. In this way, each pair of main scribe line and subordinate scribe line can be formed continuously by one scribe operation.

Figure 8:
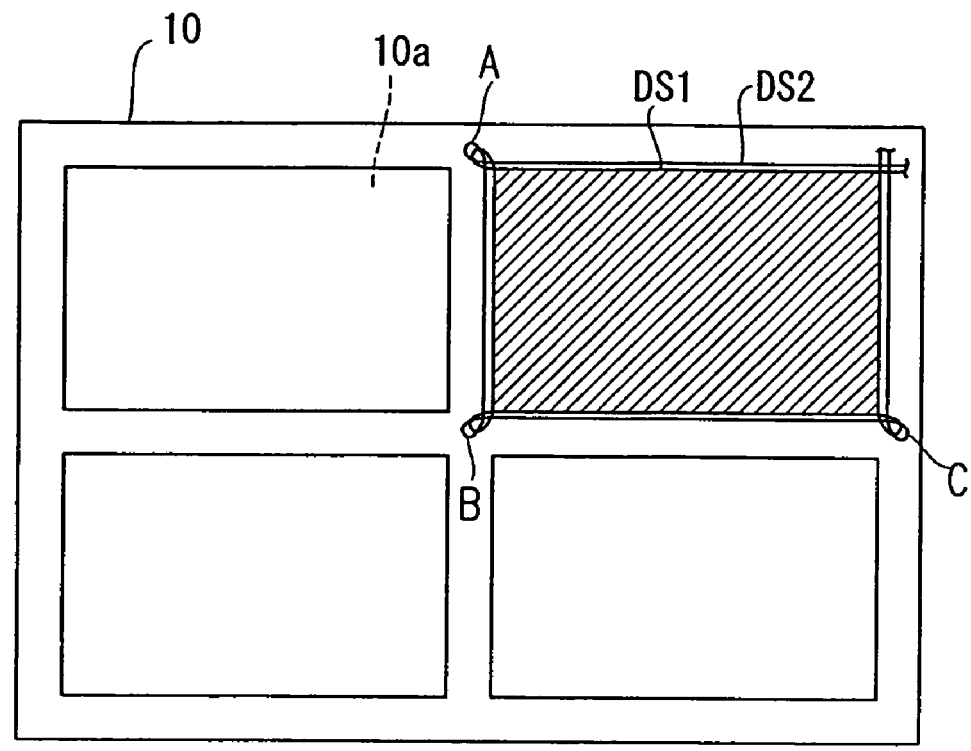
FIG. 8 is a plan view of a mother glass substrate illustrating still another substrate scribing and breaking method according to the present invention.
Figure 9:
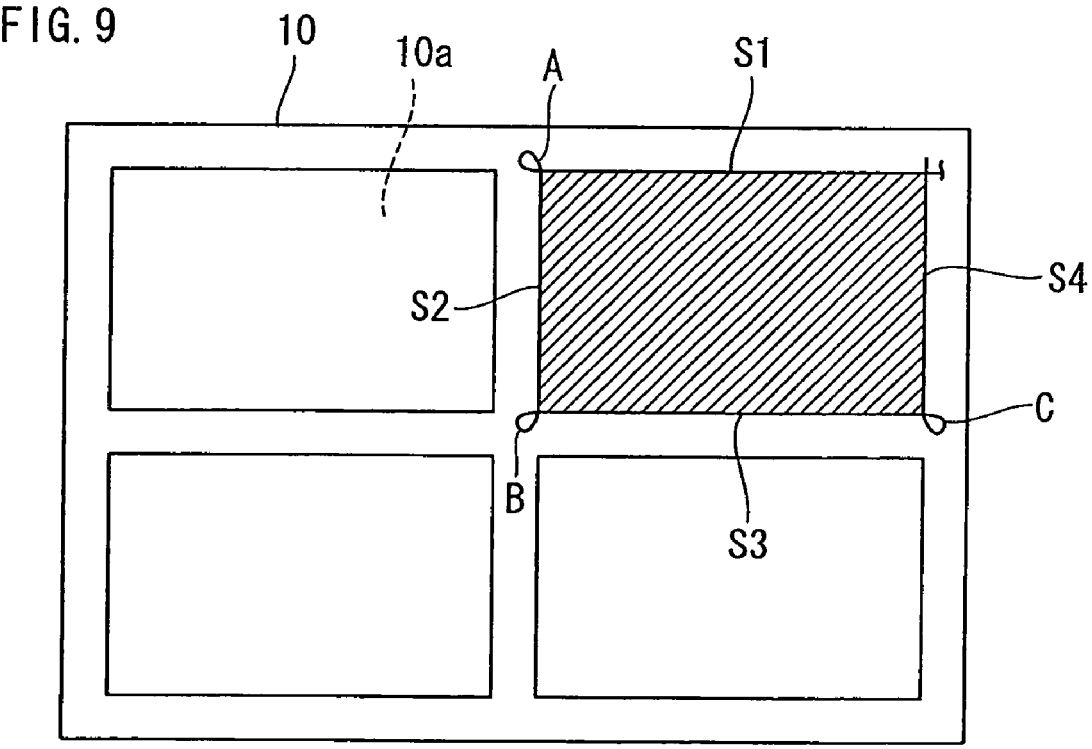
FIG. 9 is a plan view of a mother glass substrate illustrating a scribing method used for the substrate scribing and breaking method of the present invention shown in FIG. 8.
Figure 10:
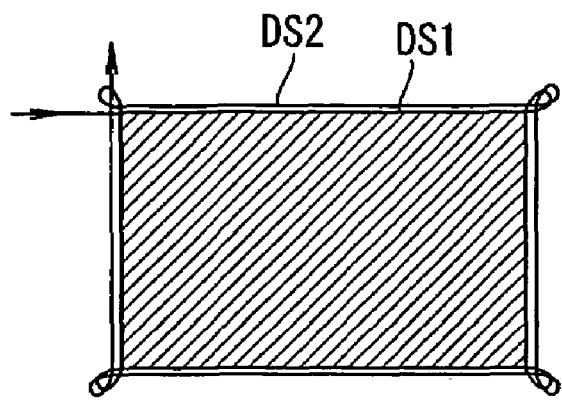
FIG. 10 is a plan view of a mother glass substrate illustrating still another substrate scribing and breaking method according to the present invention.

FIGS. 8 through 10 are schematic plan views illustrating still another scribe pattern for scribing and breaking glass substrates 10a from the mother glass substrate 10 using the double scribe lines, i.e., a main scribe line MS and a subordinate scribe line SS. First, as shown in FIGS. 8 and 9, four scribe lines along lines to be scribed and broken S1 through S4 surrounding a glass substrate 10a are formed. (Hereinafter, the four straight scribe lines along the entire perimeter of the glass substrate 10a will be each referred to as a "main scribe line DS1".) Then, four straight subordinate scribe lines DS2 are formed parallel to the main scribe lines DS1. The subordinate scribe lines DS2 are at a distance of about 0.5 mm to 1 mm from the main scribe lines DS1 and is outside the glass substrate 10a.

According to this scribing method, a new scribe line is formed so as to cross a scribe line already formed along a line to be scribed and broken (S1) by swiveling the cutter wheel 20. Thus, the pressure contact force of the cutter wheel 20 on the mother glass substrate 10 is reduced, and therefore, a part of the assembled mother glass substrate 10 is prevented from being sunk before the new scribe line crosses the scribe line already formed. This prevents the mother glass substrate 10 from being partially chiseled off when the new scribe line crosses the scribe line already formed.

When the advancing direction of the cutter wheel 20 is swiveled at 270 degrees as indicated by corners A (or B or C) of FIGS. 8 and 9 and as a result, the cutter wheel 20 is along the straight line to be scribed and broken S2 in the lateral direction of the mother glass substrate 10, which is perpendicular to the line to be scribed and broken S1, the cutter wheel 20 is rolled while exerting pressure so as to be in contact with the mother glass substrate 10 along the line to be scribed and broken S2. By this operation, a scribe line is formed along the line to be scribed and broken S2, and avertical crack forming the scribe line extends in the entire thickness of the mother glass substrate 10.

Then, similarly, the cutter wheel 20 is swiveled at the corner B at 270 degrees in a direction perpendicular to the line to be scribed and broken S2 to draw a circular line having a radius of about 1 mm, without being separated from the surface of the mother glass substrate 10. As a result, the cutter wheel 20 is along the line to be scribed and broken S3. A scribe line is formed along the line to be scribed and broken S3, and a vertical crack forming the scribe line extends in the entire thickness of the mother glass substrate 10. Then, similarly, the cutter wheel 20 is swiveled at the corner C at 270 degrees in a direction perpendicular to the line to be scribed and broken S3 to draw a circular line having a radius of about 1 mm, without being separated from the surface of the mother glass substrate 10. As a result, the cutter wheel 20 is along the line to be scribed and broken S4. A scribe line is formed along the line to be scribed and broken S4, and a vertical crack forming the scribe line extends in the entire thickness of the mother glass substrate 10.

The subordinate scribe lines DS2 are formed in a similar manner at a distance of about 0.5 mm to 1 mm from the main scribe lines DS1 formed by the method shown in FIG. 9. While the subordinate scribe lines DS2 are formed, a stress is applied on the surface of the mother glass substrate 10 in the horizontal direction which is perpendicular to the scribe line formation direction. As a result, a compressive force acts on a surface portion of the vertical crack forming the main scribe lines DS1 already formed. When the compressive force acts on the surface portion of the vertical crack forming the main scribe lines DS1, a counter force acts on a bottom portion of the vertical crack in a direction expanding the width of the vertical crack. As a result, the vertical crack extends in the thickness direction of the assembled mother substrate 10 and reaches the bottom surface of the mother glass substrate 10.

In this case, the method shown in FIG. 10 is also usable. Main scribe lines DS1 are formed. Then, subordinate scribe lines DS2 are formed continuously from the main scribe lines DS1 without separating the cutter wheel 20 from the surface of the assembled mother substrate 10, i.e., in one stroke.

Figure 11:
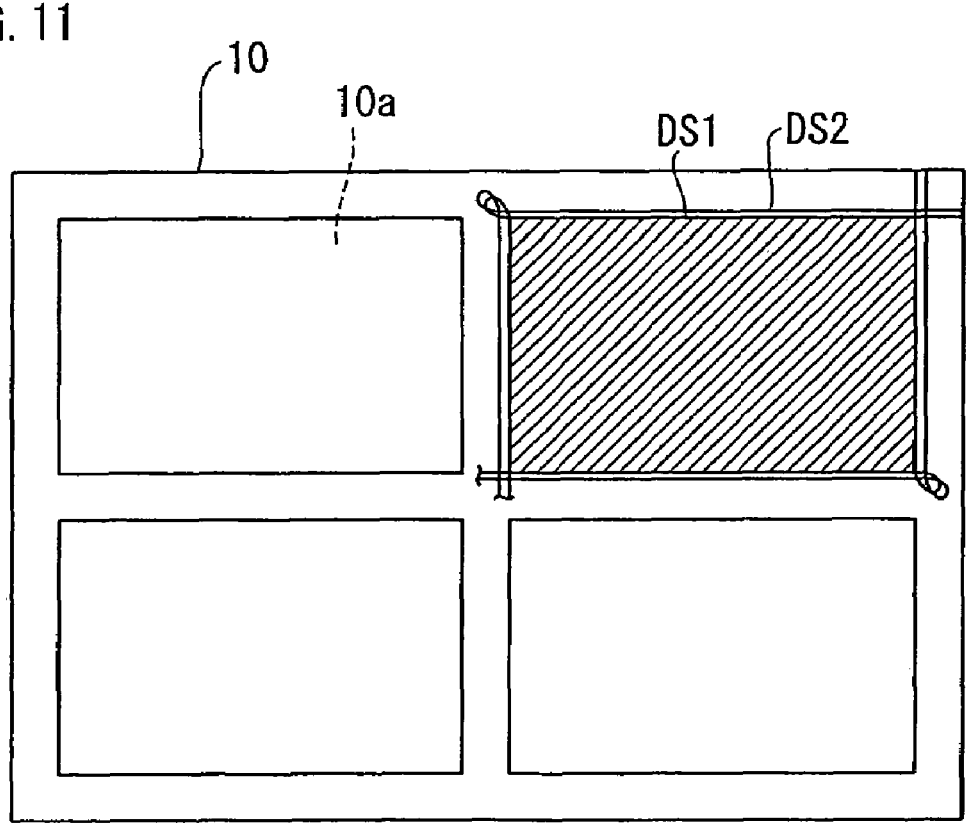
FIG. 11 is a plan view of a mother glass substrate illustrating still another substrate scribing and breaking method according to the present invention.

The above example uses the one-stroke drawing. The method shown in FIG. 11, which illustrates an example in which the one-stroke drawing is repeated twice, is also usable. In the manner shown in FIGS. 8 through 10, main scribe lines DS1 are formed along lines to be scribed and broken S1 and S2. Then, main scribe lines DS1 areformed a long lines to be scribed and broken S4 and S3. After this, subordinate scribe lines DS2 are formed.

Figure 12:
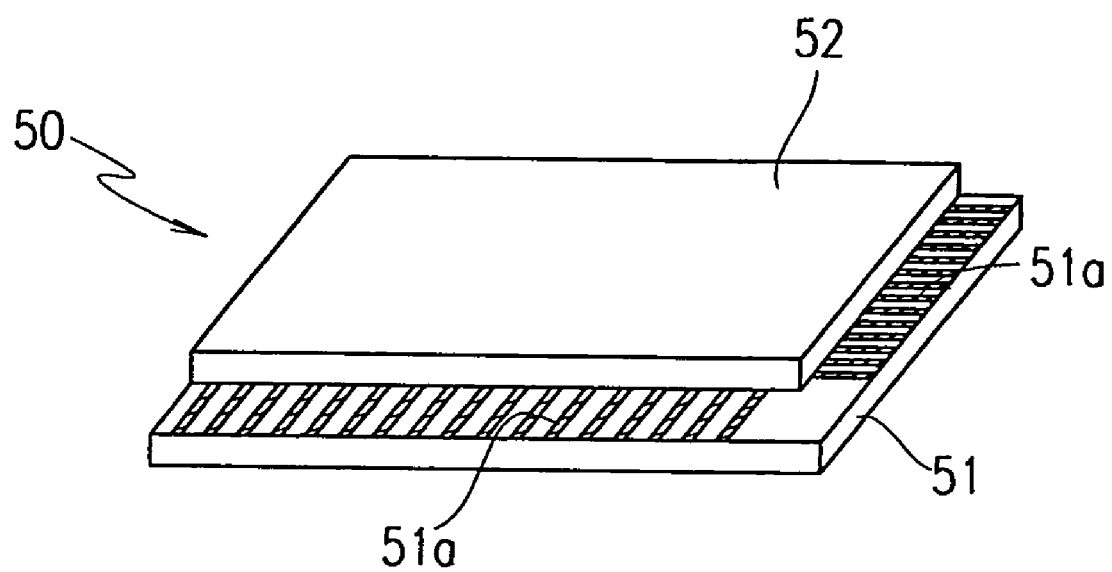
FIG. 12 is a schematic perspective view of a display panel substrate formed by applying a substrate scribing and breaking method according to the present invention.

The above-described substrate scribing and breaking methods are each preferably carried out for producing a display panel substrate of a liquid crystal display apparatus. A display panel substrate of a liquid crystal display apparatus is produced by injecting a liquid crystal material into a gap between a pair of assembled glass substrates. An exemplary display panel is shown in FIG. 12.

A display panel substrate 50 includes a TFT substrate 51 formed of glass and a CF (color filter) substrate 52 formed of glass, which are assembled together with an appropriate gap interposed therebetween. In the gap between the two substrates, a liquid crystal material is enclosed. The TFT substrate 51 includes a plurality of pixel electrodes arranged in a matrix, and a thin film transistor (TFT) connected to each of the plurality of pixel electrodes. A terminal 51a provided at an end of a signal line connected to each TFT is located along one peripheral area of the TFT substrate 51 and also in another peripheral area perpendicular to the one peripheral area.

The CF substrate 52 includes a color filter (CF). The CF substrate 52 is one size smaller than the TFT substrate 51, and is assembled with the TFT substrate 51 such that the terminals 51a provided in the TFT substrate 51 are exposed.

The TFT substrate 51 and the CF substrate 52 of the display panel substrate 50 are respectively produced by scribing and breaking a mother TFT substrate and a mother CF substrate into a substrate of a predetermined size. The mother TFT substrate is a mother glass substrate of the TFT substrate 51, and the mother CF substrate is a mother glass substrate of the CF substrate 52. For producing a display panel substrate 50, a mother TFT substrate and a mother CF substrate in an assembled state are scribed and broken into a substrate of the size of the display panel 50.

Figure 13:
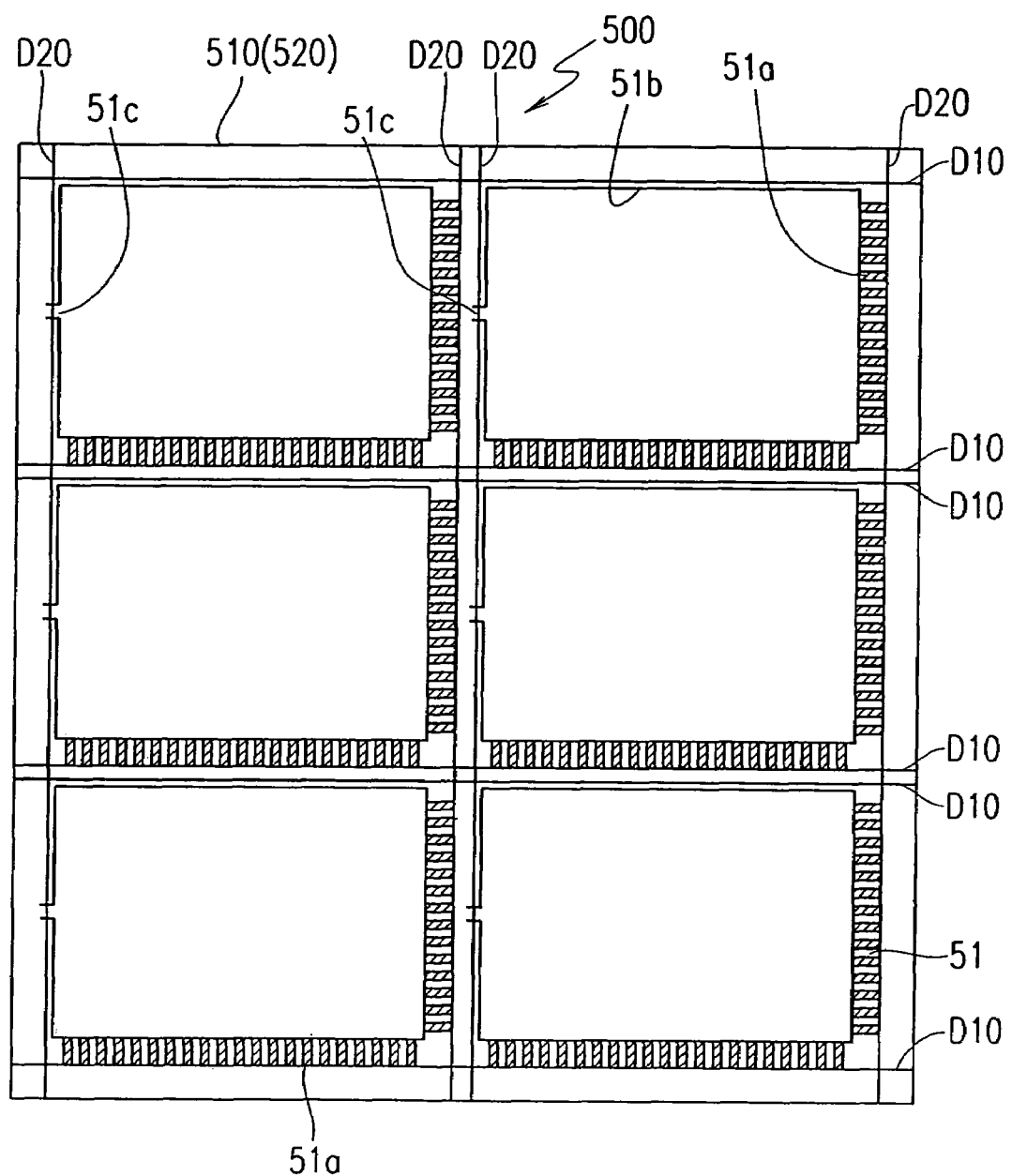
FIG. 13 is a plan view illustrating a structure of an assembled mother substrate used for producing the liquid crystal display panel substrate shown in FIG. 12.
Figure 14:
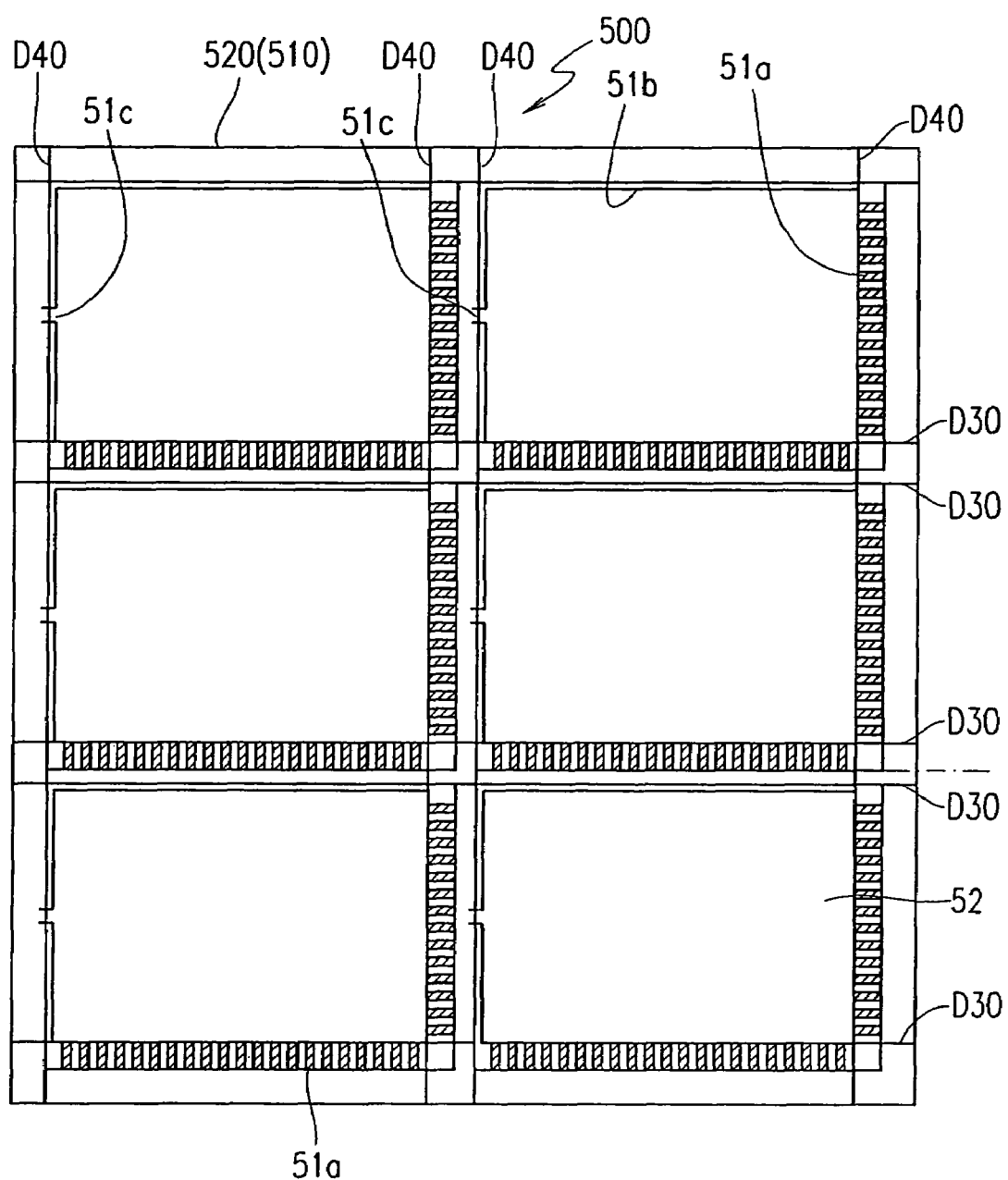
FIG. 14 is a bottom view illustrating a structure of an assembled mother substrate used for producing the liquid crystal display panel substrate shown in FIG. 12.
Figure 15A:
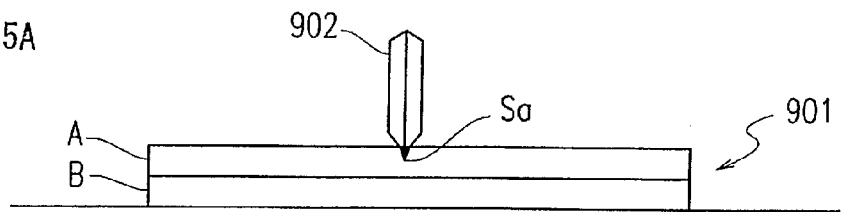
FIGS. 15A through 15D show steps of a conventional substrate scribing and breaking method.
Figure 15B:
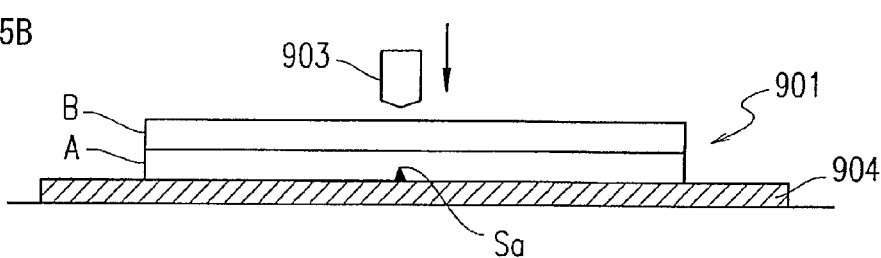
Figure 15C:
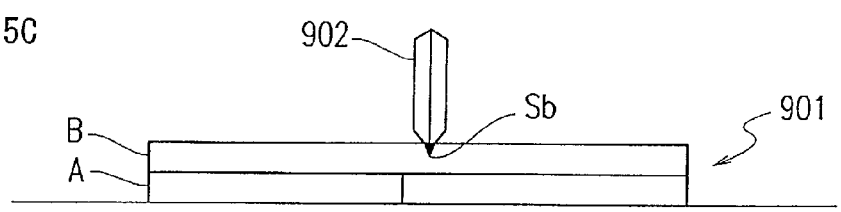
Figure 15D:
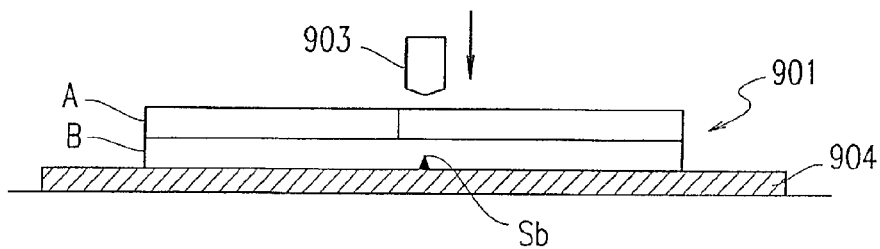

With reference to FIGS. 13 and 14, a method for scribing and breaking a pair of mother glass substrates assembled together into a plurality of display panel substrates 50 will be described. FIG. 13 is a plan view illustrating a method for scribing and breaking a TFT substrate 51 for the display panel substrate 50 from a mother TFT substrate 510. FIG. 14 is a bottom view illustrating a method for scribing and breaking a CF substrate 52 for the display panel substrate 50 from a mother CF substrate 520.

From the mother TFT substrate 510, for example, six TFT substrates 51 (3 rows×2 columns) for the display panel substrates 50 are obtained. In an area corresponding to each TFT substrate 51, a TFT, a pixel electrode, lines, terminals 51a and the like are provided. The mother CF substrate 520 has the same size as that of the mother TFT substrate 510 and includes acolor filter (CF) and the like already provided.

Each area of the mother TFT substrate 510 to be a TFT substrate 51 has a sealing member 52b in correspondence with a peripheral portion of the CF substrate 52 which are to be assembled with the TFT substrate 51. The mother TFT substrate 510 and the mother CF substrate 520 are assembled together with an appropriate gap interposed therebetween to form the assembled mother substrate 500. Each sealing member 52b has an injection opening 51c for injecting a liquid crystal material into areas surrounded by the sealing members 52b between the assembled mother TFT substrate 510 and the mother CF substrate 520. The injection openings 52c provided in the sealing members 52b are located on the same side with respect to the areas which are to be TFT substrates 51.

As shown in FIG. 13, the mother TFT substrate 510 is scribed and broken along lines to be scribed and broken D10 in the row direction (lateral direction ) and along lines to be scribed and broken D20 in the column direction (perpendicular to the lateral direction). Thus, six TFT substrates 51 are obtained. As shown in FIG. 14, the mother CF substrate 520 is scribed and broken along lines to be scribed and broken D30 in the lateral direction and along lines to be scribed and broken D40 in the direction perpendicular to the lateral direction. Thus, six CF substrates 52 are obtained. Thus, the assembled mother substrate 500 is scribed and broken into six liquid crystal display panel substrates 50.

More specifically, this is performed as follows. The assembled mother substrate 500 is placed with, for example, the mother TFT substrate 510 as an upper substrate. Main scribe lines MS and subordinate scribe lines SS described in the above examples are formed in the mother TFT substrate 510 using the cutter wheel 20. The mother TFT substrate 510 is broken along the lines to be scribed and broken D10 and D20, and thus six TFT substrates 51 are obtained.

Then, the assembled mother substrate 500 is inverted to place the mother CF substrate 520 as an upper substrate. Main scribe lines MS and subordinate scribe lines SS described in the above examples are formed in the mother CF substrate 520 using the cutter wheel 20. The mother CF substrate 520 is broken along the lines to be scribed and broken D30 and D40, and thus six CF substrates 52 are obtained. The mother CF substrate 520 is scribed and broken such that the terminals provided on the peripheral areas of the mother TFT substrate 510 are exposed. Therefore, the positions of the lines to be scribed and broken D30 and D40 are different from the positions of the lines to be scribed and broken D10 and D20, respectively.

In the above examples, methods for scribing and breaking a mother glass substrate used for a liquid crystal display panel substrate have been described. The present invention is not limited to this. The present invention is applicable to scribing and breaking quartz substrates, sapphire substrates, semiconductor wafers, ceramic substrates and the like. A substrate scribing and breaking method according to the present invention is also applicable to plasma display panels as one type of flat panel display panels, organic EL panels, inorganic EL panels, transmissive projector substrates, reflective projector substrates, and the like.

INDUSTRIAL APPLICABILITY

According to a substrate scribing and breaking method of the present invention, a substrate can be scribed and broken only by forming a scribe line in the substrate. Therefore, an inversion step of inverting the substrate and a breaking step of breaking the substrate by pressing a break bar on the substrate, which are conventionally necessary, are not required.

A substrate inversion device and a breaking device are not necessary. Therefore, a substrate can be scribed and broken more efficiently with a simpler structure and a smaller installment area.

The invention claimed is:

1. A substrate scribing and breaking method, comprising the steps of:
    forming a main scribe line along a line to be scribed and broken of a brittle substrate; and
    breaking the substrate along the main scribe line which has been formed by forming a subordinate scribe line substantially parallel to the main scribe line which has been formed, and at a distance from the main scribe line determined so as to generate a compressive force to break the substrate along the main scribe line.

2. A substrate scribing and breaking method according to claim 1, wherein a vertical crack having a surface of the substrate as a base portion is formed along the line to be scribed and broken by the formation of the main scribe line; a compressive force is generated on a surface portion of the vertical crack by the formation of the subordinate scribe line, thereby generating a tensile force on a bottom portion of the substrate; and the vertical crack extends to the bottom portion of the substrate to break the substrate.

3. A substrate scribing and breaking method according to claim 1, wherein the subordinate scribe line is formed at a distance of 0.5 mm to 1 mm from the main scribe line.

4. A substrate scribing and breaking method according to claim 1, wherein the main scribe line is formed of a vertical crack extending over at least 80% of the thickness direction of the substrate from the surface of the substrate.

5. A substrate scribing and breaking method according to claim 1, wherein either the main scribe line or the subordinate scribe line is formed such that a start position or an end position thereof is an appropriate distance away from at least one end of the line to be scribed and broken.

6. A substrate scribing and breaking method according to claim 1, wherein the main scribe line is formed by a disc-shaped cutter wheel which rolls on the surface of the substrate; a central portion of an outer circumferential surface of the cutter wheel in a thickness direction thereof projects outward to form a V-shape of an obtuse angle; and a plurality of protrusions having a predetermined height are provided at the obtuse angled portion along the entire circumference at a predetermined pitch.

7. A substrate scribing and breaking method according to claim 6, wherein a forming direction of the main scribe line and a forming direction of the subordinate scribe line by the cutter wheel are opposite to each other; and the cutter wheel forms the main scribe line and the subordinate scribe line continuously in the state of being in contact with the surface of the substrate.

8. A substrate scribing and breaking method according to claim 6, wherein after at least two main scribe lines are formed by a cutter wheel along at least two continuous lines to be scribed and broken of the substrate, subordinate scribe lines which are substantially parallel to the at least two main scribe lines which have been formed are formed by the cutter wheel.

9. A substrate scribing and breaking method according to claim 8, wherein the main scribe lines are formed continuously without separating the cutter wheel from of the substrate.

10. A substrate scribing and breaking method according to claim 9, wherein the subordinate scribe lines are formed continuously without separating the cutter wheel from the surface of the substrate.

11. A substrate scribing and breaking method according to claim 8, wherein the subordinate scribe lines are formed continuously without separating the cutter wheel from the surface of the substrate.

12. A substrate scribing and breaking method according to claim 8, wherein the cutter wheel forms one of the scribe lines, then moves on the substrate so as to draw a circular line, and then forms the other of the scribe lines.

13. A substrate scribing and breaking method according to claim 12, wherein while the cutter wheel moves on the substrate so as to draw a circular line, a pressure acting on the substrate is lower than a pressure acting on the substrate when each of the scribe lines is formed.

14. A panel production method for scribing and breaking a brittle substrate to produce a plurality of quadrangular panels continuous in at least one direction, the method comprising the steps of:
   setting four lines to be scribed and broken for the four-sided panels on the substrate;
   forming main scribe lines along the four lines to be scribed and broken which have been set; and
   breaking the substrate along the main scribe lines which have been formed by forming subordinate scribe lines substantially parallel to the main scribe lines which have been formed, and at a distance from the main scribe lines determined so as to generate a compressive force to break the substrate along the respective main scribe lines.

15. A panel production method according to claim 14, wherein the subordinate scribe lines are formed at a distance of 0.5-1.0 mm from the respective main scribe lines.

* * * * *